United States Patent [19]

Kirby et al.

[11] 4,286,966

[45] Sep. 1, 1981

[54] PROCESS FOR THE MELTING OF SULFUR

[75] Inventors: Charles R. Kirby; Donald R. McKay, both of Rossland, Canada

[73] Assignee: Cominco Ltd., Vancouver, Canada

[21] Appl. No.: 139,313

[22] Filed: Apr. 11, 1980

[51] Int. Cl.³ .............................................. B01J 8/00
[52] U.S. Cl. ............................... 23/293 S; 423/567 R
[58] Field of Search ............. 23/308 S, 293 R, 293 S; 159/47 R; 423/567 R, 567 A, 57 ER

[56] References Cited

U.S. PATENT DOCUMENTS

| | | | |
|---|---|---|---|
| 3,397,041 | 8/1968 | Rivers | 423/57 E X |
| 3,807,141 | 4/1974 | Estep et al. | 23/29 BS X |
| 3,887,425 | 6/1975 | Munch | 159/47 R X |

Primary Examiner—William A. Cuchlinski, Jr.
Attorney, Agent, or Firm—Arne I. Fors; Robert F. Delbridge

[57] ABSTRACT

A method for the removal of moisture associated with sulfur and for the melting of solid sulfur. A flow of molten sulfur is circulated through a mixing device in a substantially spiral flow wherein the circulating molten sulfur forms a continuous vortex of molten sulfur. Particulate solid sulfur with or without associated moisture, either as such or in the form of an aqueous slurry or moisture-containing liquid sulfur is fed into the vortex of circulating molten sulfur. Sulfur is discharged from the mixing device and any associated moisture is evaporated and separates from the sulfur. Molten sulfur substantially free of moisture is recovered.

15 Claims, 2 Drawing Figures

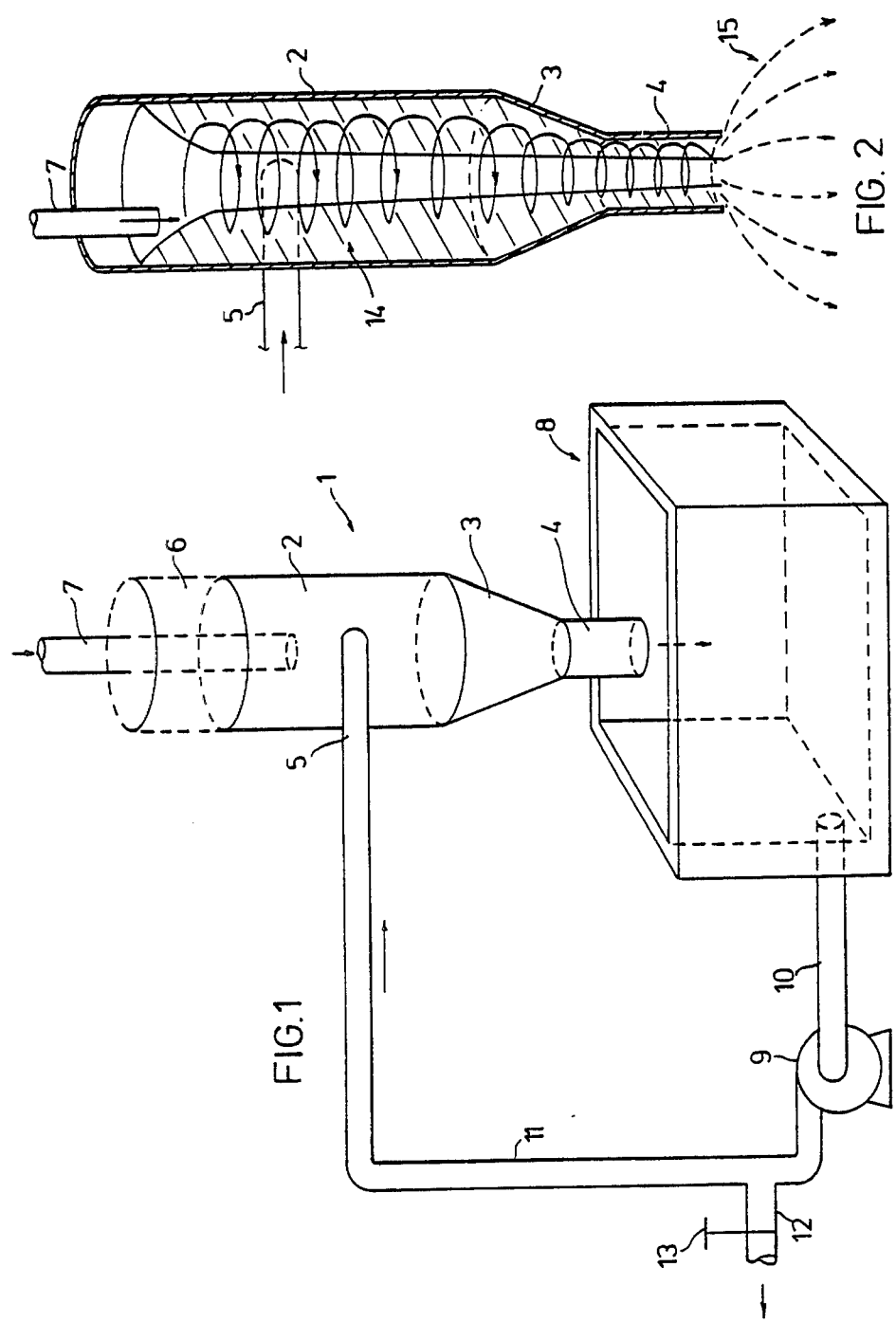

PROCESS FOR THE MELTING OF SULFUR

BACKGROUND OF THE INVENTION

The invention relates to a method and apparatus for the melting of sulfur and, more particularly, to a method and apparatus for the removal of moisture associated with sulfur and the melting of solid sulfur.

Elemental sulfur is produced in large quantities by recovery from underground sulfur deposits, recovery as a byproduct from treatment of sulfur-containing ores and minerals, and by production by such processes as the Claus process. Sulfur so produced may be transported to the consumer in liquid form or as a solid in various particulate forms, such as flakes, prills or granules, or slate sulfur. Sulfur obtained from some of the recovery processes and sulfur in liquid or in the various particulate forms often contain moisture, which is a hindrance in the subsequent processing of the elemental sulfur. In many instances, therefore, the elemental sulfur must be treated prior to processing for the removal of any contained moisture and for melting of the sulfur.

Typical sulfur melting and processing techniques are described in the following U.S. patents. U.S. Pat. No. 1,318,015 (Oct. 7, 1919) discloses a process for extracting sulfur from ore by heating the ore to liquefy the sulfur and subjecting the heated ore to the action of centrifugal force to separate liquid sulfur from the remainder of the ore. U.S. Pat. No. 2,019,112 (Oct. 20, 1935) teaches the fusing of solid material in a circulating flow of a melt of the same material and passing the melt in direct contact with a heating gas. U.S. Pat. No. 2,850,372 (Sept. 2, 1958) discloses a method and apparatus for continuously melting particles by propelling particles into suspension in a peripherally confined current of a gas while applying heat transversely to the said current. U.S. Pat. No. 3,355,259 (Nov. 28, 1967) relates to melting sulfur by adding sulfur to a bath of molten sulfur and supplying heat by submerged combustion of gas or addition of hot combustion product gases to the molten sulfur.

The melting of particulate solids by charging the particles into a circulating molten mass of the solids is described in U.S. Pat. No. 3,369,873 (Feb. 20, 1968). The molten mass is heated by withdrawing a portion near the surface, heating said withdrawn portion above the melting point of the solids, and returning the heated portion to the molten mass near the bottom thereof to establish a generally upward flow.

According to another conventional technique, sulfur is melted in sulfur melting pits. Solid sulfur is fed into an agitated bath of molten sulfur and the additionally required heat is supplied with steam coils immersed in the molten sulfur or external to the melting pit, or by direct heat exchange using hot combustion gases. This conventional technique has two major draw-backs, especially when moisture is present with the solid sulfur. The first drawback is the formation of large amounts of persistent foam and the second drawback is the required large amount of energy to heat and evaporate moisture relative to the heat capacity of molten sulfur. Another disadvantage is the need for intimate mixing of the solid sulfur with the molten sulfur in order to avoid localized cooling of the molten sulfur which might cause difficulties in controlling the process due to sharply increased viscosity of the cooler sulfur.

Thus, none of the prior art processes provides means for the removal of moisture associated with sulfur.

SUMMARY OF THE INVENTION

We have now found that the above mentioned disadvantages can be substantially alleviated by removing moisture associated with solid and liquid sulfur and melting of solid sulfur by mixing sulfur with a substantially spiral flow of molten sulfur having a vortex in a mixing device.

It is the principal object of the present invention to provide a method and apparatus for the removal of moisture which may be associated with sulfur. It is another object to provide a method and apparatus for the removal of moisture from moisture-containing liquid sulfur. It is a further object to provide a method and apparatus for the removal of moisture associated with solid sulfur without the formation of foam and for the simultaneous melting of at least a portion of the solid sulfur. These and other objects of the invention and the manner in which they can be attained will become apparent from the following detailed description of the method of the invention.

In its broadest scope, there is provided a method for separating moisture associated with sulfur which comprises the steps of establishing a source of molten sulfur, said molten sulfur having a temperature of at least about 120° C., circulating molten sulfur from said source through a mixing device and establishing in said mixing device a substantially spiral flow of circulating molten sulfur having a continuous vortex extending axially therethrough by feeding said circulating molten sulfur tangentially to said spiral flow, said spiral flow having a centrifugally accelerated velocity comprising a tangential component, increasing said tangential component of the velocity while maintaining the vortex, feeding sulfur and associated moisture into said vortex of circulating molten sulfur, discharging sulfur from said mixing device into the said source of molten sulfur and recovering molten sulfur substantially free of associated moisture.

More particularly, the method of the invention includes separating and removing moisture associated with molten sulfur or with solid sulfur during melting of the solid sulfur which comprises introducing molten sulfur to a mixing device comprising a cylindrical section, a conical section and an apex wherein a substantially spiral flow of the molten sulfur having a continuous vortex extending therethrough is established, feeding molten or particulate solid sulfur containing moisture to the mixing device into the molten sulfur in the vortex, applying a centrifugally accelerated velocity having a tangential component to the substantially spiral flow of molten sulfur, increasing said tangential component of the velocity while maintaining the vortex, discharging sulfur from said mixing device and recovering molten sulfur substantially free of associated moisture.

The apparatus of the invention comprises a mixing device which generally consists of a cylindrical vessel with a tangentially positioned inlet for feeding circulating molten sulfur, an inlet for feed sulfur and associated moisture and an outlet for substantially moisture-free molten sulfur.

Sulfur that can be treated according to the method of the invention may be solid or liquid sulfur. Solid sulfur may be in the form of crushed sulfur or sulfur particles such as flakes, prills, granules, flour and dust of sulfur.

Such particulate sulfur may contain little or no associated moisture, such as, for example, 0 to 5% moisture by weight, or may contain larger amounts of moisture. The solid sulfur may also be in the form of pastes or be contained in aqueous slurries or suspensions. Aqueous slurries or suspensions may be at least partly de-watered before being treated. Liquid sulfur contains varying amounts of moisture of up to about 5% and may also contain solid sulfur.

BRIEF DESCRIPTION OF THE DRAWINGS

The method and apparatus of the invention will now be described in detail with reference to the accompanying drawings, in which:

FIG. 1 is a perspective view of the preferred apparatus of the invention; and

FIG. 2 illustrates a sectional view of the preferred apparatus of the invention and the vortex flow path of molten sulfur.

Like reference characters refer to like parts throughout the description of the drawings.

DESCRIPTION OF THE PREFERRED EMBODIMENT

With reference to FIG. 1, which illustrates a preferred form of the apparatus of the invention, the apparatus comprises a mixing device, generally designated by numeral 1, consisting of a cylindrical section 2, a conical section 3 co-axially connected at its largest diameter to cylindrical section 2 and a cylindrically-shaped apex 4 co-axially connected to conical section 3 at its smallest diameter. The diameter of cylindrical section 2 is the same as the largest diameter of conical section 3 and the diameter of apex 4 is the same as the smallest diameter of conical section 3. The dimensions of the parts of the mixing device may vary considerably. For example, conical section 3 may be extended in length and the cylindrically-shaped apex deleted. Also, the length of conical section 3 may, for example, be a fraction of the length of cylindrical section 2. A feed pipe 5 for feeding molten sulfur into the mixing device is tangentially mounted through the wall of cylindrical section 2 at a distance below the top of cylindrical section 2. Cylindrical section 2 may optionally include an upward cylindrical extension 6, as indicated by ghost lines. Inlet means 7 for feed sulfur such as liquid or solid sulfur containing moisture or slurries containing solid sulfur is positioned at the top of cylindrical section 2.

Moisture-containing liquid sulfur may be fed to the mixing device through inlet means 7 directly into the vortex of circulating molten sulfur, or, alternatively, into the flow of circulating molten sulfur in tangential feed pipe 5. Depending on the form of sulfur to be treated, inlet means 7 may have several forms. Inlet means 7 may be a pipe, as shown, which is connected to a suitable reservoir (not shown) containing moisture-containing liquid sulfur or a pumpable slurry of solid sulfur in water, said slurry containing water in the range of about 25 to 70% by weight of the slurry. Alternatively, inlet means 7 may be a launder, a belt or other suitable feeding device for feeding particulate sulfur, particulate sulfur with associated moisture and moisture containing sulfur in the form of a slurry or suspension. The inlet means 7, from which sulfur or sulfur slurry is fed into the mixing device, may be centrally located in the top of cylindrical section 2 or alternatively, in the top of the optional extension 6. Preferably, inlet means 7 is located off-centre in the top and close to the wall of cylindrical section 2 (as shown in FIG. 2) or of extension 6 to ensure that sulfur fed from inlet means 7 contacts molten sulfur in the mixing device at its highest possible level. If desired, inlet means 7 may extend into cylindrical section 2 or into the optional upward extension 6. The device may be insulated and/or provided with a steam-jacket (not shown).

Mixing device 1 is connected to a source of molten sulfur, preferably a molten sulfur reservoir, generally indicated at 8, from which molten sulfur is circulated through the mixing device. Mixing device 1 is preferably positioned above molten sulfur reservoir 8 in a vertical position, as shown, or in an inclined position, for discharge of molten sulfur into reservoir 8. Positioning in an inclined position facilitates the feeding of sulfur or sulfur slurry from inlet means 7 into the molten sulfur contained within mixing device 1.

Reservoir 8 is shown in FIG. 1 as having rectangular cross-sections, but other configurations are equally suitable. A suitable pump 9 is connected with reservoir 8 through suction line 10 and with tangential feed pipe 5 via line 11. Molten sulfur may be withdrawn from reservoir 8 through line 12 which is provided with shut-off means 13. Pump 9, sulfur lines 10, 11 and 12, shut-off means 13 and feed pipe 5 are steam-traced and insulated.

According to the method of the invention, feed sulfur, in the forms as discussed above, is fed into the mixing device 1 by means of inlet means 7. The form and size, or dimensions, of inlet means 7 are chosen with regard to the form of the feed sulfur and the capacity of the mixing device. The temperature of solid sulfur with or without associated moisture is usually the ambient temperature, such as for example 20° C. If desired, aqueous slurries of solid sulfur may be preheated to a temperature in the range of from about 20° C. to the boiling point of the aqueous phase. The temperature of moisture-containing liquid sulfur is usually above the melting point of sulfur and may range from about 120° to 160° C.

Molten sulfur is circulated from the source of molten sulfur, i.e. reservoir 8, by pump 9 through lines 10 and 11, through tangential feed pipe 5 and mixing device 1, and returned to reservoir 8. The temperature of molten sulfur in reservoir 8 is maintained above the melting point of sulfur, i.e. above about 120° C. The temperature of the circulating molten sulfur is preferably raised to a temperature well above the melting point of sulfur. This may be accomplished by heat exchange means, such as, for example steam coils (not shown) placed in reservoir 8, or by suitable heat exchange means (not shown) situated in molten sulfur line 11. The temperature of the molten sulfur in the reservoir and the circulating molten sulfur fed to tangential feed pipe 5 should be in the range of about 120° to 160° C. and is preferably maintained at a temperature in the range of about 130° to 158° C.

The circulating molten sulfur enters cylindrical section 2 tangentially from tangential feed pipe 5 and forms a layer of molten sulfur in the form of a vortex 14 extending axially through device 1. Molten sulfur spirals downwardly through cylindrical section 2, conical section 3 and apex 4 as shown in FIG. 2. Feed sulfur with associated moisture, is introduced through inlet means 7 and is directed into the vortex 14 of molten sulfur where it rapidly mixes with the molten sulfur. As stated above, moisture-containing liquid sulfur may, alternatively, be fed into the mixing device by adding it to circulating molten sulfur in feed pipe 5. Water vapor generates from any moisture associated with the sulfur and, when solid sulfur is present, at least a portion of the solid sulfur melts simultaneously. The mixed flow of molten sulfur and feed sulfur is centrifugally accelerated in the spiral flow of circulating molten sulfur. In the preferred form of the mixing device, as illustrated, the tangential velocity component increases with decreasing diameter when the mixed flow passes through conical section 3. It is believed that the rapid mixing as a result of shear forces in the vortex of circulating molten sulfur in the mixing device, together with the heat capacity of the circulating molten sulfur, enhances heat transfer with generation of moisture as water vapor and melting of at least a portion of any solid sulfur. Sulfur and generated water vapor discharge from the bottom of mixing device and leave apex 4 in the form of spray discharge, generally indicated by numeral 15. Generated water vapor contained with the sulfur separates and flashes from the sulfur in the spray discharge. Some water vapor may also be emitted from the top of cylindrical section 2 or, alternatively, from the top of extension 6. Sulfur exiting from the bottom of apex 4 collects in reservoir 8. The temperature of the discharging sulfur should not be lower than the melting point of sulfur, for example, not lower than about 120° C.

The feed rates of circulating molten sulfur and feed sulfur may vary over wide ranges, dependent on the dimensions of the parts of the mixing device, and must be chosen in relation to each other such that moisture associated with the feed sulfur is substantially eliminated. The amount of feed sulfur fed into the vortex of molten sulfur in the mixing device should not be greater than the amount that will result in substantially complete separation of moisture associated with the feed sulfur.

The feed rate of feed sulfur, the moisture content of the feed sulfur and the heat-capacity of the circulating molten sulfur and flow velocity necessary to maintain a continuous vortex throughout the length of the spiral flow of circulating molten sulfur, determine the feed rate of circulating molten sulfur. The minimum feed rate of circulating molten sulfur at a given temperature is that at which sulfur discharging from the mixing device starts to solidify and/or the vortex in the mixing device disappears. The upper limit of the feed rate of circulating molten sulfur is determined by the capacity of the mixing device; the upper limit is reached upon the occurrence of excessive climbing of molten sulfur up the inside wall of the mixing device. The presence of the optional extension 6 of cylindrical section 2, therefore, serves to contain molten sulfur in the mixing device, or to increase the feed rate of circulating molten sulfur.

When feeding solid sulfur into the mixing device, at least a portion of the solid sulfur melts during its passage through the device. When feeding finely divided solid sulfur, substantially complete melting may be obtained, while when feeding coarser particulate sulfur at least a portion of the solid sulfur will melt. It is not necessary that all solid sulfur fed to the mixing device is melted as further melting of sulfur takes place in molten sulfur reservoir 8 and during circulation of molten sulfur through the mixing device. Thus, it is understood that molten sulfur circulated from the source of molten sulfur, i.e. molten sulfur reservoir 8, may contain particulate solid sulfur.

The invention will now be illustrated by the following non-limitative examples.

EXAMPLE 1

A mixing device with the following dimensions was used in conjunction with apparatus as described.

| | | |
|---|---|---|
| cylindrical section 2 | length | 40 cm |
| | diameter | 20 cm |
| extension 6 | length | 15 cm |
| | diameter | 20 cm |
| conical section 3 | length | 12.5 cm |
| | largest diameter | 20 cm |
| | smallest diameter | 7.5 cm |
| apex 4 | length | 30 cm |
| | diameter | 7.5 cm |
| tangential feed pipe 5 | diameter | 5 cm |
| inlet pipe 7 positioned 5 cm off-centre | diameter | 2.5 cm |

The tangential feed pipe was located 25 cm below the top of the cylindrical section. The mixing device was vertically positioned above a reservoir containing molten sulfur at a temperature of 139° C. Steam flowing through coils placed in the molten sulfur maintained the temperature of the molten sulfur at 139° C. Molten sulfur was pumped from the vessel to the tangential feed pipe of the mixing device at a rate of 220 L/min. A vortex of molten sulfur formed in the mixing device leaving a void space in the centre along the axis of the device. A slurry of solid sulfur containing 43% water and having a temperature of 20° C. was pumped through the inlet pipe into the top of the mixing device and into the vortex of molten sulfur at a rate of 3.15 L/min. Sulfur discharged from the apex in the form of a spray discharge and had a temperature of 130° C. Copious amounts of water vapor evolved from the discharging sulfur and some water vapor emitted from the top of the mixing device. Very little foam formed on the top of the molten sulfur in the reservoir and the foam readily subsided when the feeding of sulfur slurry was halted. Recovered sulfur was substantially free of moisture.

EXAMPLE 2

The test described in Example 1 was repeated using the same equipment and conditions, except that the slurry of solid sulfur contained 30% water and was fed at a rate of 6.75 L/min. Copious amounts of steam evolved from the sulfur discharging from the mixing device. A small amount of foam formed in the molten sulfur reservoir, but the foam readily subsided when the feeding of sulfur slurry was terminated. Recovered sulfur was substantially free of moisture.

EXAMPLE 3

The conical section of the mixing device used in Examples 1 and 2 was changed to one having a length of 15 cm, a largest diameter of 20 cm and a smallest diameter of 5 cm. The diameter of the apex was reduced to a diameter of 5 cm, the length remaining unchanged. Molten sulfur having a temperature of 137° C. was circulated from the molten sulfur reservoir and was fed through the tangential feed pipe at a rate of 169 L/min. A slurry of particulate sulfur slurry containing 30% water and having a temperature of 20° C. was pumped into the top of the mixing device and into the vortex of molten sulfur at a rate of 11.25 L/min. The sulfur discharging from the mixing device had a temperature of 114° C. and some sulfur started to solidify and build up in the area of the spray discharge. This indicated that the limit for the operating conditions with the size of apex used was reached. It is noted that the limit can be overcome by preheating the sulfur slurry, or by using a larger size apex and increasing the circulation rate and/or the temperature of the molten sulfur.

It is understood, of course, that modifications can be made in the embodiment of the invention illustrated and described herein without departing from the scope and purview of the invention as defined by the appended claims.

What we claim as new and desire to protect by Letters Patent of the United States is:

1. A method for separating moisture associated with sulfur at atmospheric pressure which comprises the steps of establishing a source of molten sulfur, said molten sulfur having a temperature of at least about 120° C., circulating molten sulfur at a temperature in the range of about 120° to 160° C. from said source through a mixing device and establishing in said mixing device a substantially spiral flow of circulating molten sulfur having a continuous vortex extending axially through the mixing device by feeding said circulating molten sulfur tangentially to said spiral flow, said spiral flow having a centrifugally accelerated velocity comprising a tangential component, increasing said tangential component of the velocity while maintaining the vortex, feeding sulfur having associated moisture in the range of 0 to 70% by weight into said vortex of circulating molten sulfur, discharging molten sulfur at a temperature of not less than 120° C. from said mixing device into the said source of molten sulfur and recovering molten sulfur having a temperature of not less than about 120° C. substantially free of associated moisture.

2. A method as claimed in claim 1, in which said mixing device comprises a cylindrical section into which the circulating molten sulfur is tangentially fed, a conical section appended thereto in which the tangential component of the velocity is increased, and an apex appended to the conical section from which the molten sulfur is discharged, said vortex extending substantially axially through the mixing device.

3. A method as claimed in claim 2, wherein said sulfur is fed into the circulating molten sulfur in said vortex of molten sulfur in the cylindrical section.

4. A method as claimed in claim 2, wherein the sulfur and associated moisture is fed into the circulating molten sulfur in said vortex with the circulating molten sulfur which is tangentially fed.

5. A method as claimed in claim 1, 2 or 3, wherein the circulating molten sulfur has a temperature in the range of about 130° to 158° C.

6. A method as claimed in claim 1, 2 or 3, wherein said sulfur and associated moisture fed into the circulating molten sulfur is in one or more particulate forms chosen from crushed sulfur, sulfur prills, sulfur flakes, sulfur granules, sulfur dust and flour of sulfur.

7. A method as claimed in claim 1, 2 or 3, wherein said sulfur and associated moisture fed into the circulating molten sulfur is particulate sulfur containing associated moisture in the range of about 0 to 5% by weight.

8. A method as claimed in claim 1, 2 or 3, wherein said sulfur and associated moisture fed into the circulating molten sulfur is in a form chosen from an aqueous slurry of sulfur and an aqueous suspension of sulfur.

9. A method as claimed in claim 1, 2 or 3, wherein said sulfur and associated moisture fed into the circulating molten sulfur is in the form of an aqueous pumpable slurry containing an amount of water in the range of about 25 to 70% by weight of said slurry.

10. A method as claimed in claim 1, 2 or 3, wherein the sulfur containing associated moisture fed into the circulating molten sulfur is solid sulfur and wherein said solid sulfur is fed into the vortex of the substantially spiral flow of molten sulfur in an amount not greater than the amount that will effect substantially complete melting of the solid sulfur and substantially complete separation of contained moisture.

11. A method as claimed in claim 1, 2 or 3, wherein said sulfur and associated moisture fed into the circulating molten sulfur is in the form of an aqueous slurry and said slurry is preheated to a temperature in the range of from about 20° C. to the boiling point of the aqueous phase prior to being fed to the vortex.

12. A method as claimed in claim 1, 2 or 3, wherein said flow of circulating molten sulfur contains solid sulfur.

13. A method as claimed in claim 1, 2 or 3, wherein said sulfur and associated moisture fed to the circulating molten sulfur is solid sulfur and wherein at least a portion of said solid sulfur is melted in said vortex.

14. A method as claimed in claim 1, 3 or 4, wherein said sulfur and associated moisture fed to the circulating molten sulfur is liquid sulfur containing moisture in an amount of up to about 5%.

15. A method as claimed in claim 1, 3 or 4, wherein said sulfur and associated moisture fed to the circulating molten sulfur is liquid sulfur containing moisture in an amount of up to about 5% and wherein said liquid sulfur is fed into the substantially spiral flow of molten sulfur in an amount not greater than the amount that will effect substantially complete separation of contained moisture.

* * * * *